(12) United States Patent
Jeong et al.

(10) Patent No.: US 11,145,906 B2
(45) Date of Patent: Oct. 12, 2021

(54) SECONDARY BATTERY CELL TRANSFER APPARATUS FOR PROCESS OF FOLDING SECONDARY BATTERY CELL

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 0 days.

(21) Appl. No.: 16/928,456

(22) Filed: Jul. 14, 2020

(65) Prior Publication Data
US 2021/0280913 A1 Sep. 9, 2021

(30) Foreign Application Priority Data
Mar. 5, 2020 (KR) .................... 10-2020-0027482

(51) Int. Cl.
*H01M 10/00* (2006.01)
*H01M 10/0583* (2010.01)
*H01M 50/256* (2021.01)

(52) U.S. Cl.
CPC ..... *H01M 10/0583* (2013.01); *H01M 50/256* (2021.01)

(58) Field of Classification Search
CPC .............. H01M 10/0413; H01M 2220/20
See application file for complete search history.

(56) References Cited

U.S. PATENT DOCUMENTS

2016/0149254 A1* 5/2016 Ban .................... H01M 10/0585
29/623.3

FOREIGN PATENT DOCUMENTS

KR 10-1766966 B1 8/2017

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

There is provided a secondary battery cell transfer apparatus for a process of folding a secondary battery cell, including: multiple stations disposed at an equal interval and sequentially disposed in a straight process direction; tables provided in the multiple stations, respectively, and configured to vacuum-grip and support the secondary battery cell from below the secondary battery cell; transfer bars provided in the multiple stations, respectively; vacuum gripping units provided in the table and the transfer bar, respectively, and configured to selectively apply vacuum gripping force to the secondary battery cell; a lifting unit configured to operate a lifting operation of the transfer bar; and a straight transfer drive unit configured to operate a straight reciprocating motion of the transfer bar, in which productivity may be improved by reducing the tact time for a folding process.

12 Claims, 11 Drawing Sheets

SECONDARY BATTERY CELL TRANSFER APPARATUS FOR PROCESS OF FOLDING SECONDARY BATTERY CELL

CROSS-REFERENCE TO RELATED APPLICATIONS

This application claims the priority of Korean Patent Application No. 10-2020-0027482 filed on Mar. 5, 2020, in the Korean Intellectual Property Office, the disclosure of which is incorporated herein by reference.

FIELD

The present disclosure relates to a secondary battery cell transfer apparatus for a process of folding a secondary battery cell, and more particularly, to a secondary battery cell transfer apparatus for a process of folding a secondary battery cell, in which secondary battery cells are simultaneously and individually transferred from a first station to a second station among multiple stations continuously arranged to fold a pouch of the secondary battery cell, and the secondary battery cell is vacuum-sucked in a vacuum gripping manner and then transferred, such that productivity may be improved by reducing the tact time for the folding process.

BACKGROUND

This section provides background information related to the present disclosure which is not necessarily prior art.

A secondary battery cell includes a rectangular main region in which an electrode assembly formed by stacking a positive electrode plate, a separator, and a negative electrode plate is received in a pouch, and a sealing region (terrace) formed by sealing a rim of the pouch.

In this case, the sealing region is folded several times to prevent insulation breakdown and minimize a size of the secondary battery cell, and the folded sealing region is called a folding unit.

Meanwhile, FIG. 1 is a view illustrating an apparatus for folding a pouch for a secondary battery in the related art.

Referring to FIG. 1, the apparatus for folding a pouch for a secondary battery in the related art includes three folding units 100, 200, and 300 and two compression units 400 and 500 which are disposed along a route through which a secondary battery is transferred.

The folding units 100, 200, and 300 include a first folding unit 100 configured to fold a pouch wing at 90 degrees, a second folding unit 200 configured to fold the pouch wing, which is folded at 90 degrees, to 180 degrees, and a third folding unit 300 configured to fold the pouch wing, which is folded at 180 degrees, to 270 degrees.

In addition, the compression units 400 and 500 includes a first compression unit 400 configured to press the pouch wing folded at 180 degrees by the second folding unit 200, and a second compression unit 500 configured to press the pouch wing folded at 270 degrees by the third folding unit 300.

As described above, the first to third folding units 100, 200, and 300 are sequentially disposed in the transfer direction of the secondary battery, the first compression unit 400 is positioned between the second folding unit 200 and the third folding unit 300, and the second compression unit 500 is positioned at a rear side of the third folding unit 300.

Meanwhile, in the apparatus for folding a pouch for a secondary battery in the related art, in order to transfer the secondary battery cell for a folding process, n nests are disposed on an endless track which is moved to respective process positions for performing the folding process, and the secondary battery cells are seated in the respective nests. Further, a cover, which is fixed by force of a spring, is installed to transfer the secondary battery cells, such that the folding process may be performed in each of the stations.

For example, the nest may be provided such that 10 to 20 pairs of plates attached with two pairs of upper and lower V rollers are installed with the endless track V-type rail connected to vertically symmetrical semicircles with straight lines. The transfer and folding processes may be performed on the secondary battery cells in the nests.

However, in the case of this transfer method in the related art, a relatively large overhang is required because the secondary battery cells are transferred by rotating the nests. Further, because the cover is fixed and released by means of mechanical clamps, a relatively large amount of time is required to fix and release the secondary battery cell, which causes a problem of an increase in tact time for the folding process.

Further, a degree to which the secondary battery cell is fixed is low because the secondary battery cell is fixed to the nest by means of the cover. For this reason, a working speed needs to be maintained below a predetermined working speed when performing the folding process, which causes an increase in tact time for a folding process. As a result, there is a limit in increasing productivity.

Furthermore, there is a problem in that the quality in folding a pouch for a secondary battery cell deteriorates because there is a high likelihood of the nests swaying while the secondary battery cells are transferred and thus the folding process may be performed in an unaligned state.

DOCUMENT OF RELATED ART

Patent Document

1. Korean Patent No. 10-1766966

SUMMARY

An object of the present disclosure is to provide a secondary battery cell transfer apparatus for a process of folding a secondary battery cell, in which secondary battery cells are simultaneously and individually transferred from a first station to a second station among multiple stations continuously arranged to fold a pouch of the secondary battery cell, and the secondary battery cell is vacuum-sucked in a vacuum gripping manner and then transferred, such that productivity may be improved by reducing the tact time for the folding process.

Another object of the present disclosure is to provide a secondary battery cell transfer apparatus for a process of folding a secondary battery cell, in which a table on which a secondary battery cell is seated is vacuum-gripped, a process is performed in a first station in a state in which the secondary battery cell is vacuum-gripped, the secondary battery cell is transferred to a second station when the process is completed, and a transfer bar returns back to an original position and vacuum-grips a subsequent secondary battery cell, such that the secondary battery cell may be smoothly fixed in a vacuum gripping manner or released, and as a result, the tact time for a folding process may be further reduced.

Still another object of the present disclosure is to provide a secondary battery cell transfer apparatus for a process of folding a secondary battery cell, in which a secondary battery cell may be stably fixed with a sufficient pressure during a folding process, and the secondary battery cell may be vacuum-sucked, and aligned and transferred at an exact position, such that the folding quality may be improved.

This section provides a general summary of the disclosure and is not a comprehensive disclosure of its full scope or all of its features.

An aspect of the present disclosure provides a secondary battery cell transfer apparatus for a process of folding a secondary battery cell, the secondary battery cell transfer apparatus including: multiple stations disposed at an equal interval and sequentially disposed in a straight process direction so as to perform a process of folding a sealing region of a secondary battery cell; tables provided in the multiple stations, respectively, and configured to vacuum-grip and support the secondary battery cell from below the secondary battery cell; transfer bars provided in the multiple stations, respectively, and configured to vacuum-grip the secondary battery cell from below the secondary battery cell and transfer the secondary battery cell between the first station and the second station arranged continuously in the process direction, the transfer bar being configured to vacuum-grip the secondary battery cell, which is supported by the table in the first station, from below the secondary battery cell, move the secondary battery cell upward, and then move the secondary battery cell to the second station straight, and the transfer bar being configured to move downward, so that the secondary battery cell is seated on the table of the second station, and then return to a position of the first station; vacuum gripping units provided in the table and the transfer bar, respectively, and configured to selectively apply vacuum gripping force to the secondary battery cell; a lifting unit configured to operate a lifting operation of the transfer bar; and a straight transfer drive unit configured to operate a straight reciprocating motion of the transfer bar.

The secondary battery cell transfer apparatus for a process of folding a secondary battery cell according to one aspect of the present disclosure, the table may be configured as a straight bar parallel to the process direction, the tables may be provided in two parallel rows in the process direction so as to support both sides of a lower surface of the secondary battery cell, the transfer bar may be disposed between the tables provided in two rows, and the transfer bar may be provided straight so as to be parallel to the table.

The secondary battery cell transfer apparatus for a process of folding a secondary battery cell according to one aspect of the present disclosure, the vacuum gripping unit may include: multiple vacuum pads provided on the table and the transfer bar, respectively, and provided on a surface that comes into contact with the secondary battery cell; a vacuum control line configured to communicate with the vacuum pads; a pump configured to selectively communicate with the vacuum control line and apply vacuum by discharging air positioned in a space between the vacuum pads and the secondary battery cell; a vacuum release line configured to selectively communicate with the vacuum control line and release the vacuum by allowing the space between the vacuum pad and the secondary battery cell to communicate with outside air; and a change-over valve configured to allow the vacuum control line to selectively communicate with the pump and the vacuum release line.

The secondary battery cell transfer apparatus for a process of folding a secondary battery cell according to one aspect of the present disclosure, when the secondary battery cell is seated on the table of the first station, a process may be performed on the secondary battery cell in the first station in a state in which the secondary battery cell is vacuum-gripped by a table vacuum pad of the first station.

The secondary battery cell transfer apparatus for a process of folding a secondary battery cell according to one aspect of the present disclosure, when the process in the first station is completed, the vacuum of the table vacuum pad of the first station may be released, and the secondary battery cell may be vacuum-gripped by the transfer bar of the first station which is moved upward by the lifting unit.

The secondary battery cell transfer apparatus for a process of folding a secondary battery cell according to one aspect of the present disclosure, the secondary battery cell may be vacuum-gripped by the transfer bar of the first station, transferred to the second station by the straight transfer drive unit, and then seated on the table of the second station as the transfer bar of the first station is moved downward by the lifting unit.

The secondary battery cell transfer apparatus for a process of folding a secondary battery cell according to one aspect of the present disclosure, the secondary battery cell is vacuum-gripped by a table vacuum pad of the second station when the transfer bar of the first station may be moved downward and seated on the table of the second station, and the transfer bar of the first station may release the vacuum, move downward, and then return to the first station when the secondary battery cell is vacuum-gripped by the table vacuum pad of the second station.

The secondary battery cell transfer apparatus for a process of folding a secondary battery cell according to one aspect of the present disclosure, the lifting unit may include: a lifting motor configured to provide lifting drive power; a rotary shaft configured to be rotated by the lifting drive power; and a universal joint configured to transmit rotational force of the rotary shaft, as lifting force, to the transfer bar.

The secondary battery cell transfer apparatus for a process of folding a secondary battery cell according to one aspect of the present disclosure, the straight transfer drive unit may include: an LM guide provided on a lower portion of the transfer bar, coupled to a base unit for supporting the multiple stations so as to be movable straight; a transfer motor configured to provide straight transfer force; and a cable bear configured to reciprocate the LM guide between the first station and the second station in accordance with the straight drive power.

The secondary battery cell transfer apparatus for a process of folding a secondary battery cell according to one aspect of the present disclosure, the multiple stations may include: a loader unit configured to load the secondary battery cell; a cell alignment unit configured to align the loaded secondary battery cell; a side cutter unit configured to cut a side of the aligned secondary battery cell by a predetermined length; multiple folding units configured to fold the side of the secondary battery cell by a predetermined angle; multiple hot-press units provided at rear ends of the multiple folding units, respectively, and configured to perform a hot-press process on the side of the secondary battery cell in a state in which the side of the secondary battery cell is folded by the predetermined angle; a sizing roller unit configured to align the secondary battery cell in accordance with a size of the secondary battery cell when the hot-press process on the side of the secondary battery cell is completed and the secondary battery cell is transferred; and an unloader unit configured to unload the secondary battery cell transferred from the sizing roller unit.

The secondary battery cell transfer apparatus for a process of folding a secondary battery cell according to one aspect of the present disclosure, the multiple folding units may include: a first folding unit configured to fold the side of the secondary battery cell by 180 degrees; and a second folding unit configured to fold the side of the secondary battery cell by 270 degrees.

The secondary battery cell transfer apparatus for a process of folding a secondary battery cell according to one aspect of the present disclosure, the tables may be separately disposed to correspond to the multiple stations, respectively, or the tables may be provided to be connected one another over the multiple stations.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Exemplary embodiments of the present invention will now be described in detail with reference to the accompanying drawings.

Hereinafter, exemplary embodiments of a secondary battery cell transfer apparatus for a process of folding a secondary battery cell according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conform to the technical spirit of the present disclosure without being limited to a dictionary meaning when recognizing the intrinsic technical spirit of the present disclosure.

Hereinafter, the exemplary embodiment of the present disclosure will be described with reference to the accompanying drawings.

Figure 1:
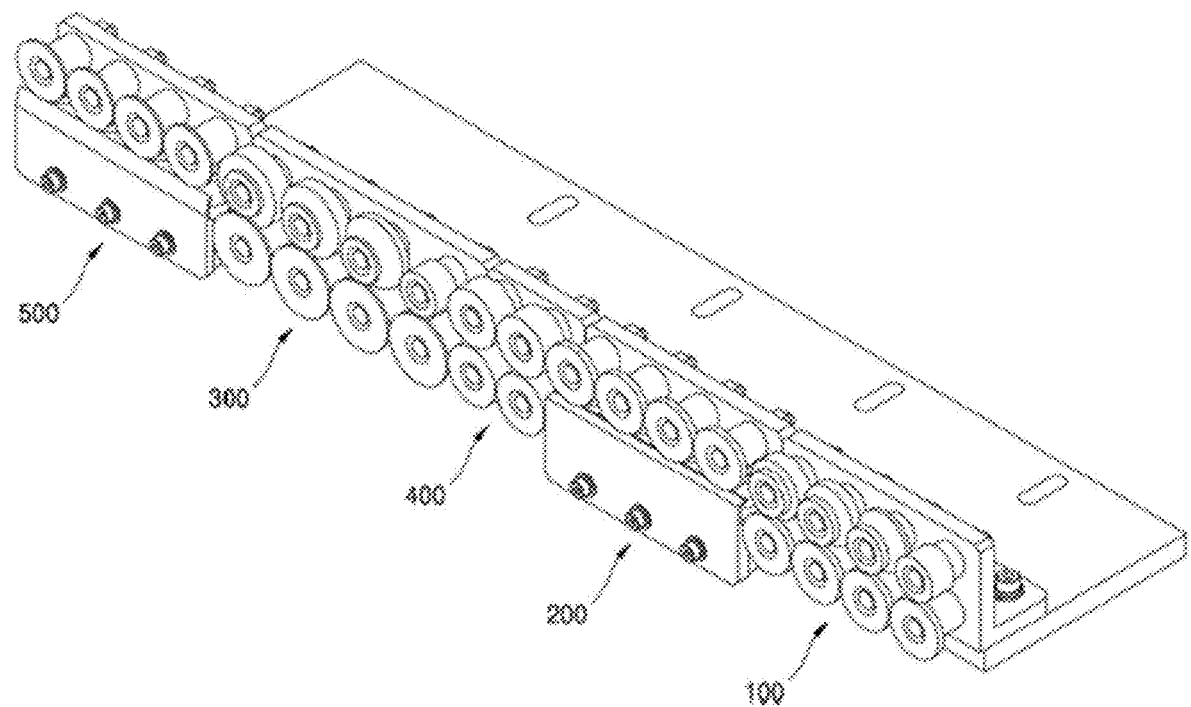
FIG. 1 is a view illustrating an apparatus for folding a pouch for a secondary battery in the related art.
Figure 2:
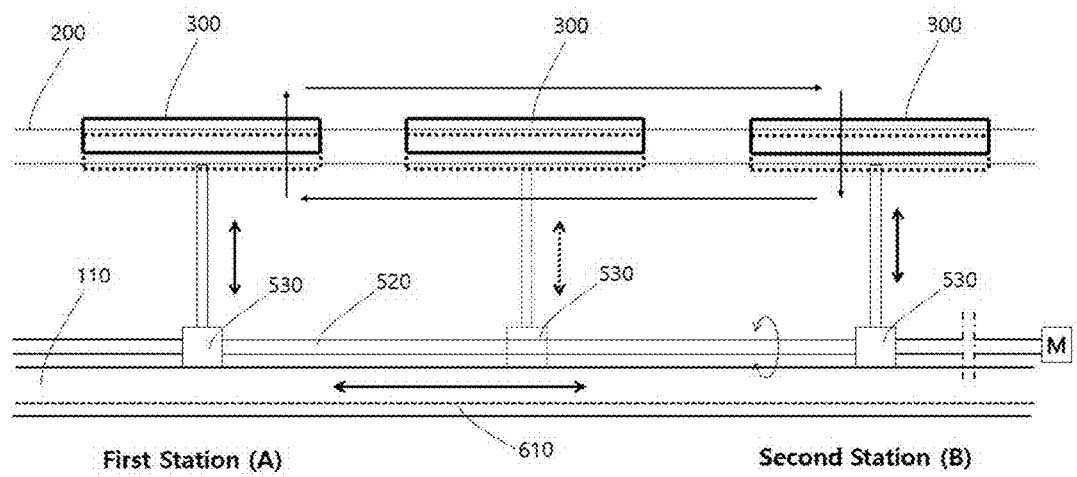
FIG. 2 is a view for explaining a transfer operation of a secondary battery cell transfer apparatus for a process of folding a secondary battery cell according to an exemplary embodiment of the present disclosure.

FIG. 2 is a view for explaining a transfer operation of a secondary battery cell transfer apparatus for a process of folding a secondary battery cell according to an exemplary embodiment of the present disclosure, and FIGS. 3A to 3G are views illustrating a step-by-step transfer operation of the secondary battery cell transfer apparatus for a process of folding a secondary battery cell according to the exemplary embodiment of the present disclosure.

Referring to FIGS. 2, and 3A to 3G, the secondary battery cell transfer apparatus for a process of folding a secondary battery cell according to the exemplary embodiment of the present disclosure may include multiple stations 100, tables 200, transfer bars 300, vacuum gripping units 400, lifting units 500, straight transfer units 600, and the like.

The multiple stations 100 are sequentially disposed in a straight process direction and arranged at equal intervals so as to perform a process of folding a sealing region of a secondary battery cell 10.

The tables 200 are provided in the multiple stations 100, respectively, and may vacuum-grip and support the secondary battery cell from below the secondary battery cell. Each of the table 200 is configured as a straight bar parallel to the process direction. The tables 200 may be provided in two parallel rows in the process direction so as to support both sides of a lower surface of the secondary battery cell 10.

The tables 200 are described as being provided in the multiple stations 100, respectively, as described above, but the tables 200 may be provided to be connected to one another over all the multiple stations 100.

In addition, a configuration in which the secondary battery cell 10 is vacuum-gripped and transferred solely for the purpose of respective processes in the multiple stations 100 or fixed to the table 200 during the processes will be described below. However, the secondary battery cell 10 may also be seated and fixed on a separate nest and then vacuum-gripped and transferred, and the secondary battery cell 10 may be seated on the table 200 and vacuum-gripped during the processes.

The transfer bars 300 are provided in the multiple stations 100, respectively. The transfer bar 300 vacuum-grips and transfers the secondary battery cell 10, from below the secondary battery cell 10, between the first station and the second station continuously arranged in the process direction. The transfer bar 300 vacuum-grips and moves the secondary battery cell 10 upward, from below the secondary battery cell 10 supported by the table 200 in the first station, moves straight to the second station, moves downward so that the secondary battery cell 10 is seated on the table 200 of the second station. Then, the transfer bar 300 may be returned to the position in the first station.

The transfer bar 300 is disposed between the tables 200 provided in rows, and the transfer bar 300 may be provided straight so as to be parallel to the table.

The vacuum gripping units 400 are provided on the table 200 and the transfer bar 300, respectively, and may selectively apply vacuum gripping force to the secondary battery cell 10.

The lifting unit 500 may operate the upward and downward movement of the transfer bar 300.

The straight transfer drive unit 600 operates a straight reciprocating motion of the transfer bar 300.

A detailed configuration of the secondary battery cell transfer apparatus for a process of folding a secondary battery cell according to the exemplary embodiment of the present disclosure configured as described above will be described below.

In this case, a transfer operation of the secondary battery cell transfer apparatus for a process of folding a secondary battery cell according to the exemplary embodiment of the present disclosure will be described with reference to FIG. 2. The secondary battery cell 10 is vacuum-gripped (vacuum-sucked) by using the vacuum gripping unit 400 provided on the table 200 in the first station A, such that the process may be performed in the first station A.

Further, when the process is completed in the first station A, the transfer bar 300 of the first station A is moved upward (from the dotted line position) by the lifting unit 500 and comes into contact with a lower surface of the secondary battery cell 10. When the lower surface of the secondary battery cell 10 is vacuum-gripped, the vacuum gripping unit 400 of the table 200 may release the vacuum. When the vacuum gripping unit 400 of the table 200 releases the vacuum, the transfer bar 300 may be moved upward to predetermined position (the solid line position) in the state in which the secondary battery cell 10 is vacuum-gripped.

In this state, the transfer bar 300 is moved to the second station B by the straight transfer drive unit 600. When the transfer bar 300 reaches the second station B, the transfer bar 300 may be moved downward by the lifting unit 500 until the secondary battery cell 10 is seated on the table 200.

Next, when the secondary battery cell 10 is seated on the table 200, the secondary battery cell 10 is vacuum-gripped by the vacuum gripping unit 400 of the table 200, and then the vacuum gripping unit 400 of the transfer bar 300 releases the vacuum. After the vacuum is released, the transfer bar 300 may be moved downward to a predetermined position (the dotted line position). Thereafter, the transfer bar 300 may be returned from the second station B to the first station A by the straight transfer drive unit 600.

Figure 3A:
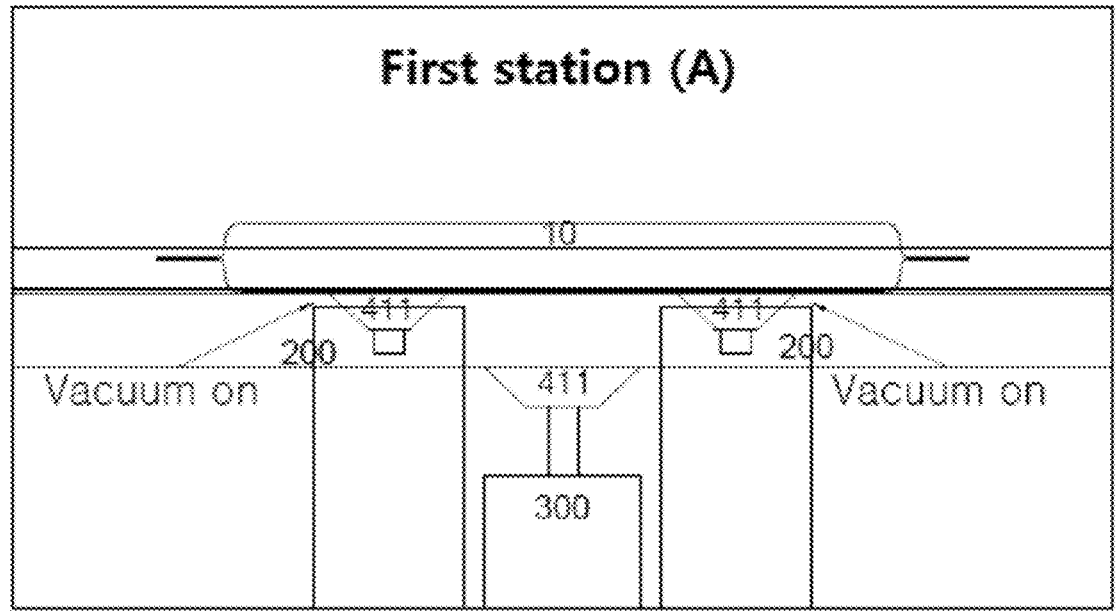
FIGS. 3A, 3B, 3C, 3D, 3E, 3F and 3G are views illustrating a step-by-step transfer operation of the secondary battery cell transfer apparatus for a process of folding a secondary battery cell according to the exemplary embodiment of the present disclosure.

A step-by-step transfer process of the secondary battery cell transfer apparatus for a process of folding a secondary battery cell according to the exemplary embodiment of the present disclosure will be described with reference to FIGS. 3A to 3G. The secondary battery cell 10, which is positioned as illustrated in FIG. 3A, is seated on the table 200 of the first station A (i.e., the station in which the current process is performed), and the seated secondary battery cell 10 may be vacuum-gripped (vacuum-sucked) by the vacuum gripping unit 400 provided in the table 200 of the first station A.

In this case, with the vacuum suction control of the vacuum gripping unit 400 provided in the table 200 of the first station A, the process may be performed on the front end components in the state in which the secondary battery cell 10 is vacuum-gripped.

Figure 3B:
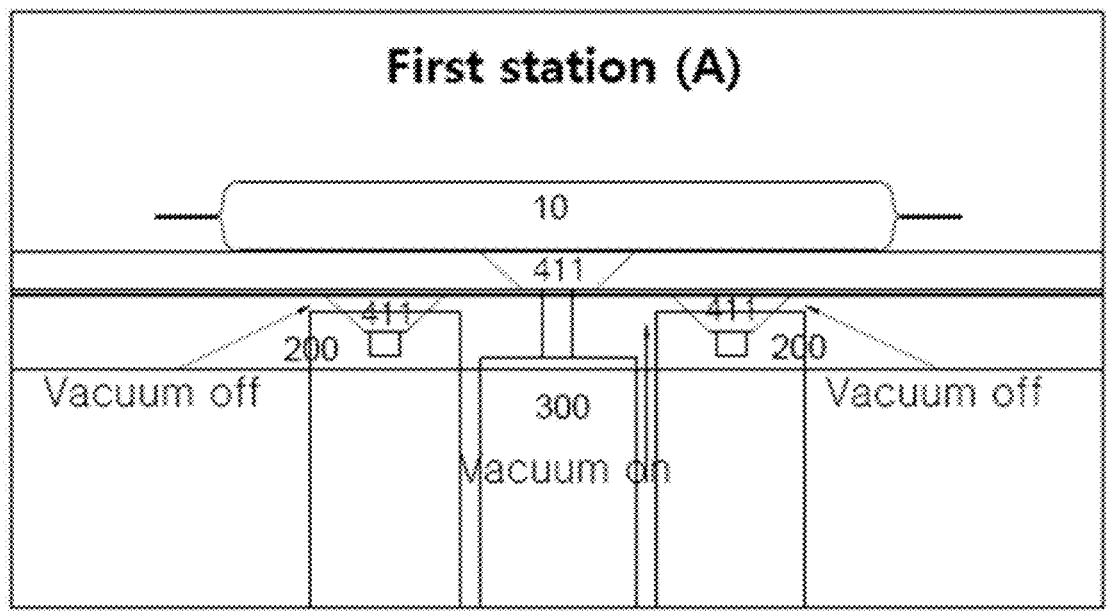

Further, when the process on the secondary battery cell 10 is completed in the first station A as illustrated in FIG. 3B, the transfer bar 300 is moved upward by the lifting unit 500, and the transfer bar 300 of the first station A is moved upward to the upper surface of the table 200 (i.e., the lower surface of the secondary battery cell 10), such that the secondary battery cell 10 may be vacuum-gripped by the vacuum suction control of the vacuum gripping unit 400.

Figure 3C:
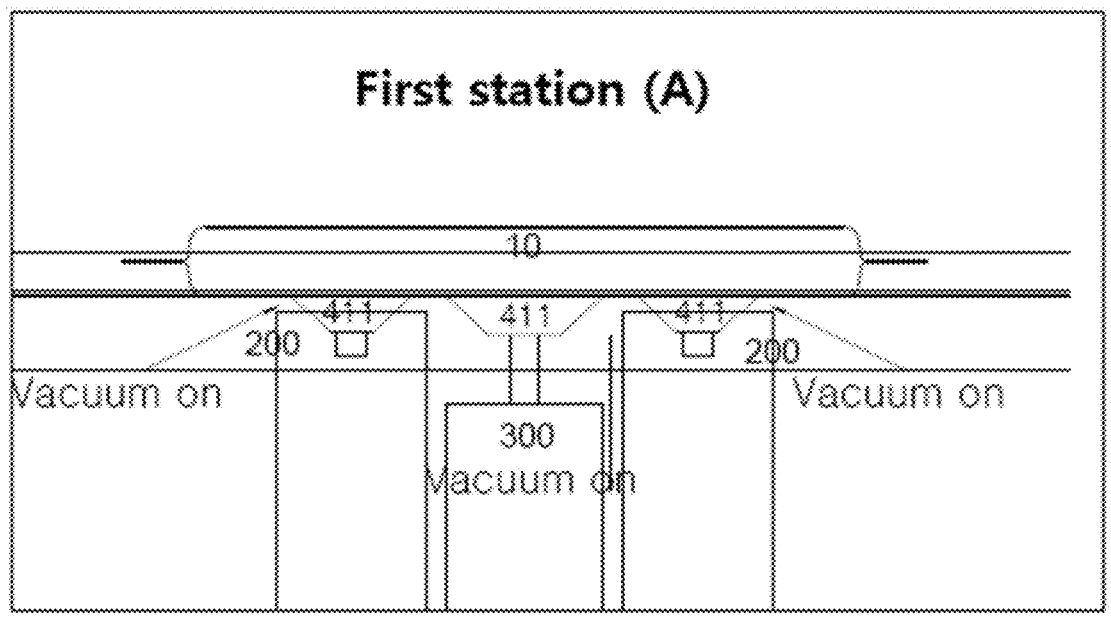

In addition, as illustrated in FIG. 3C, the vacuum of the vacuum gripping unit 400 of the table 200 provided in the first station A is released by the vacuum release control of the vacuum gripping unit 400. As the transfer bar 300 is moved upward by the lifting unit 500, the secondary battery cell 10 vacuum-gripped by the transfer bar 300 of the first station A may be moved upward to a predetermined position (i.e., the height at which the secondary battery cell 10 is to be transferred to the second station B).

Figure 3D:
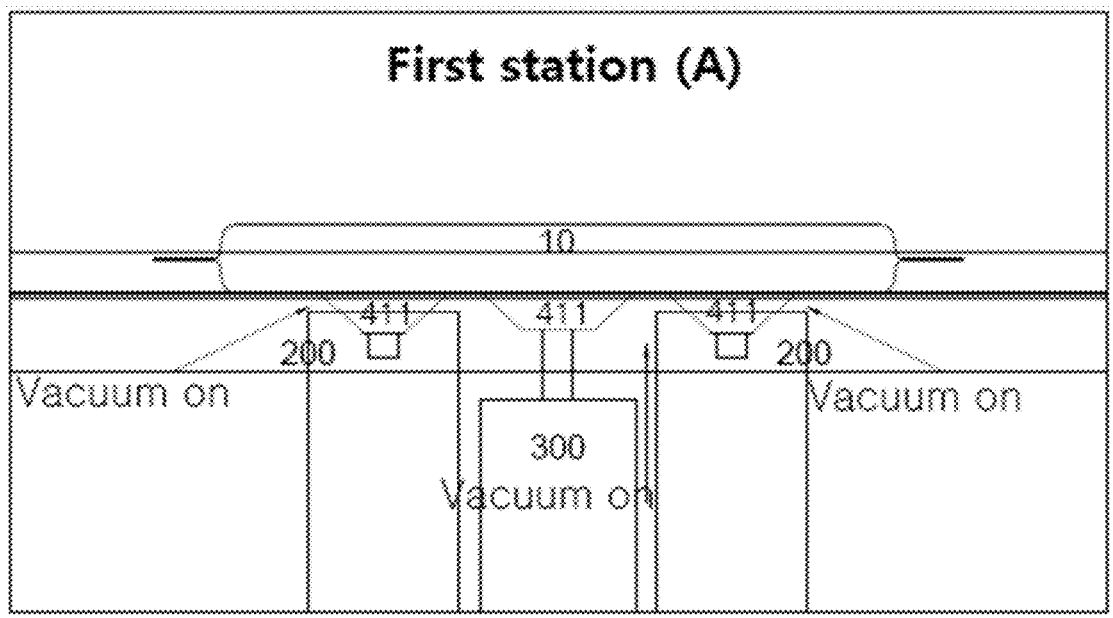

Next, as illustrated in FIG. 3D, the secondary battery cell 10 is vacuum-gripped by the transfer bar 300 of the first station A and may be transferred to the second station B by a straight transfer drive unit 930.

Figure 3E:
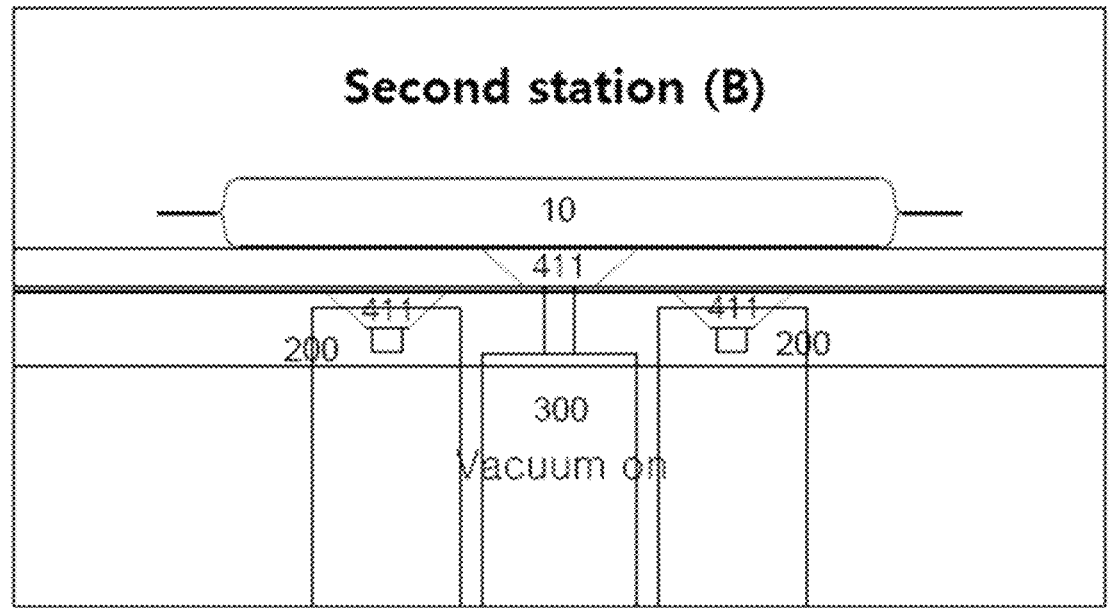

Further, as illustrated in FIG. 3E, as a transfer bar body 910 is moved downward by the lifting unit 500, the front end transfer bar 300 is moved downward, such that the secondary battery cell 10 may be seated on the table 200 of the second station B. The secondary battery cell 10 may be vacuum-gripped by the vacuum suction control of the vacuum gripping unit 400.

Figure 3F:
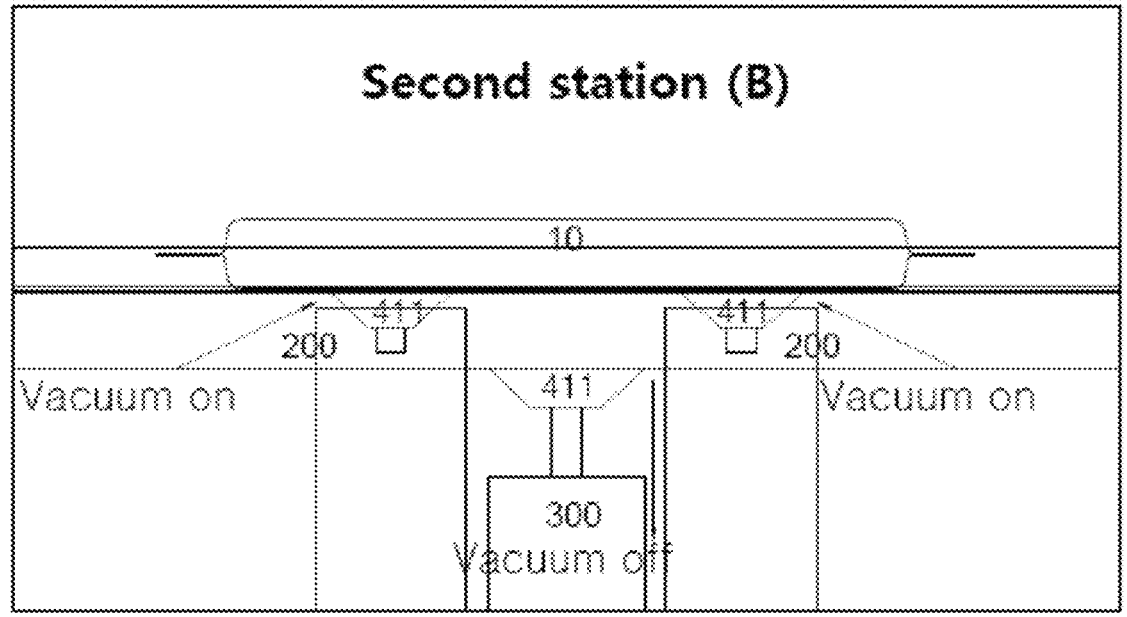
Figure 3G:
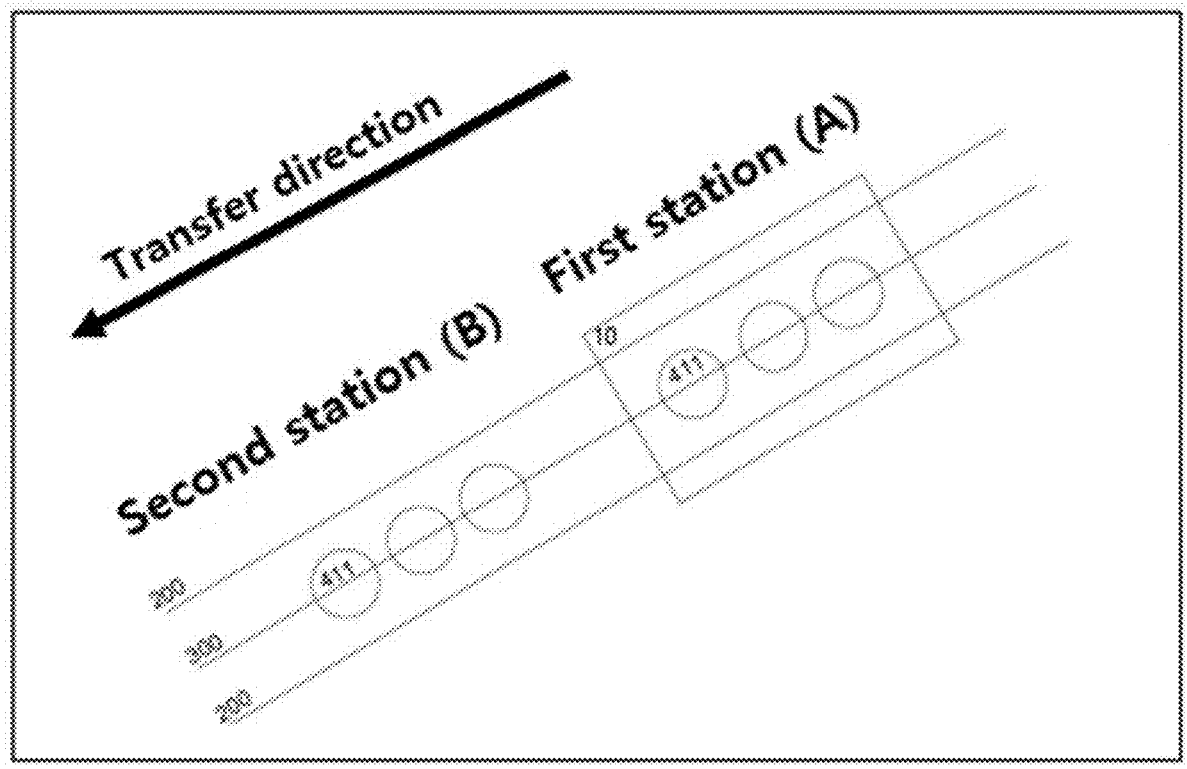

Next, as illustrated in FIG. 3F, when the secondary battery cell 10 is vacuum-gripped by the vacuum gripping unit 400 of the table 200 provided in the second station B, the vacuum of the transfer bar 300 of the first station A is released by the vacuum release control of the vacuum gripping unit 400 provided in the transfer bar 300 of the first station A. The transfer bar 300 of the first station A is moved downward to the predetermined position by the lifting unit 500, and then the transfer bar 300 of the first station A may be returned to the first station A by the straight transfer drive unit 600.

Figure 4:
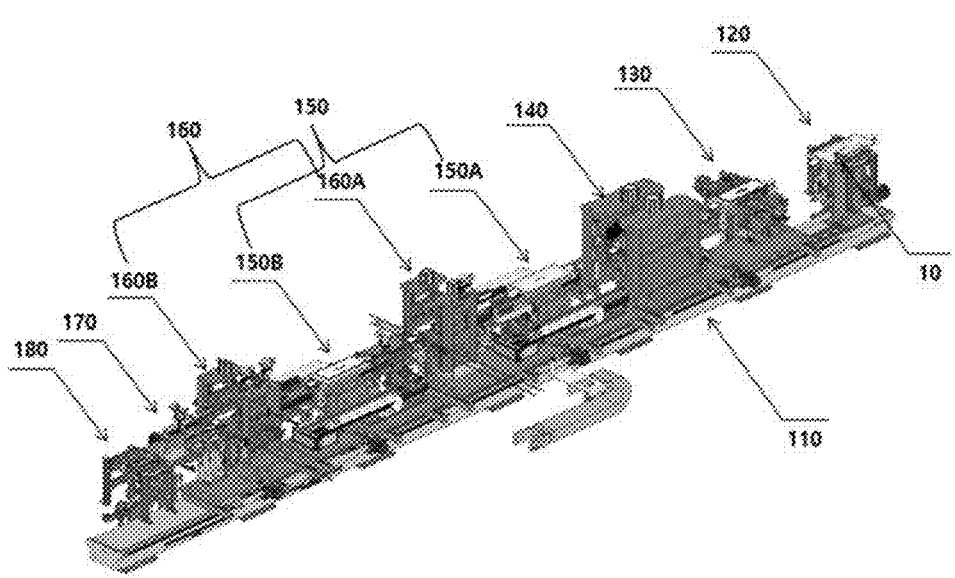
FIG. 4 is a view illustrating multiple stations having the secondary battery cell transfer apparatus for a process of folding a secondary battery cell according to the exemplary embodiment of the present disclosure.
Figure 5A:
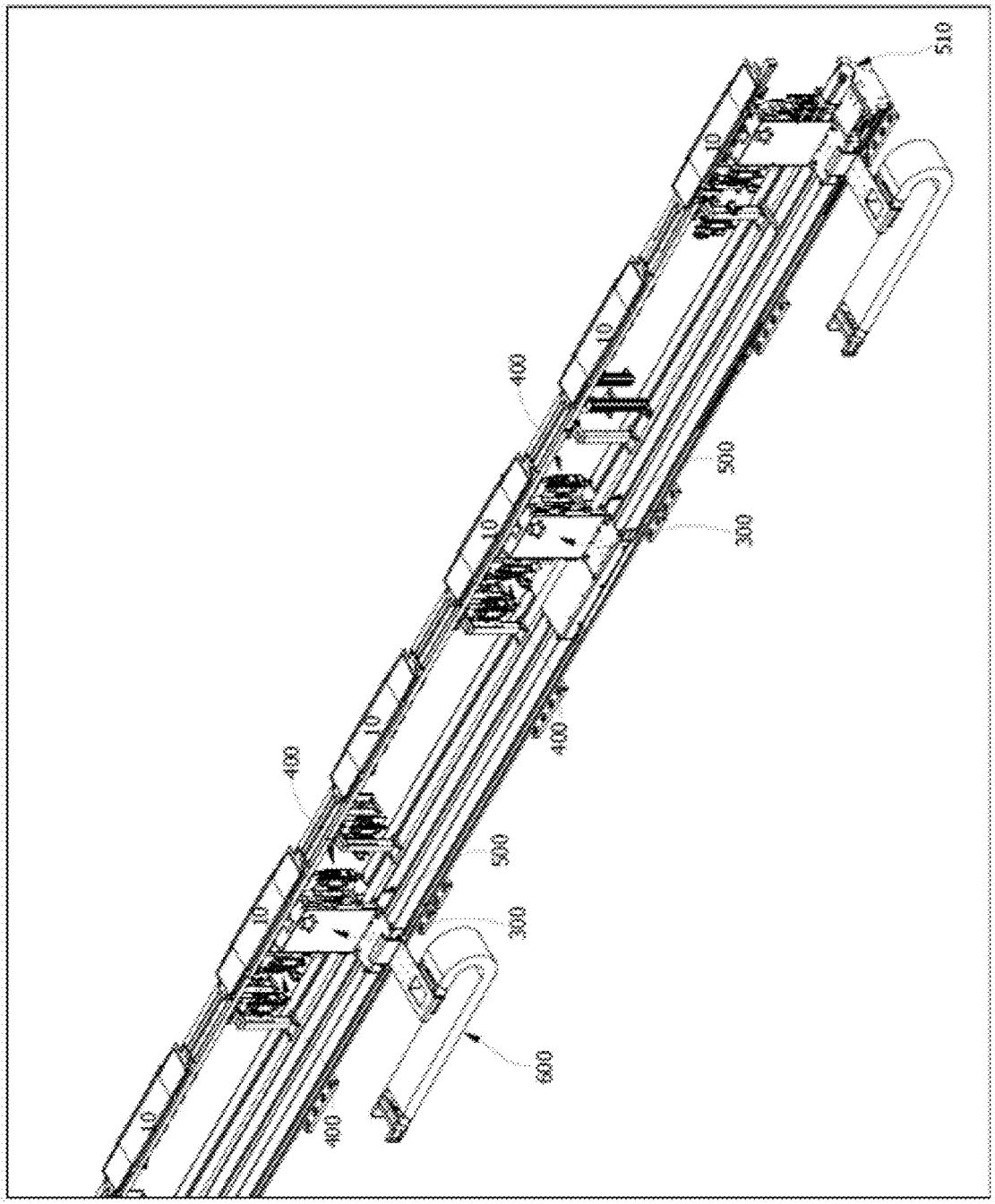
FIGS. 5A, 5B, 5C and 5D are detailed configuration views of the secondary battery cell transfer apparatus for a process of folding a secondary battery cell according to the exemplary embodiment of the present disclosure.
Figure 5B:
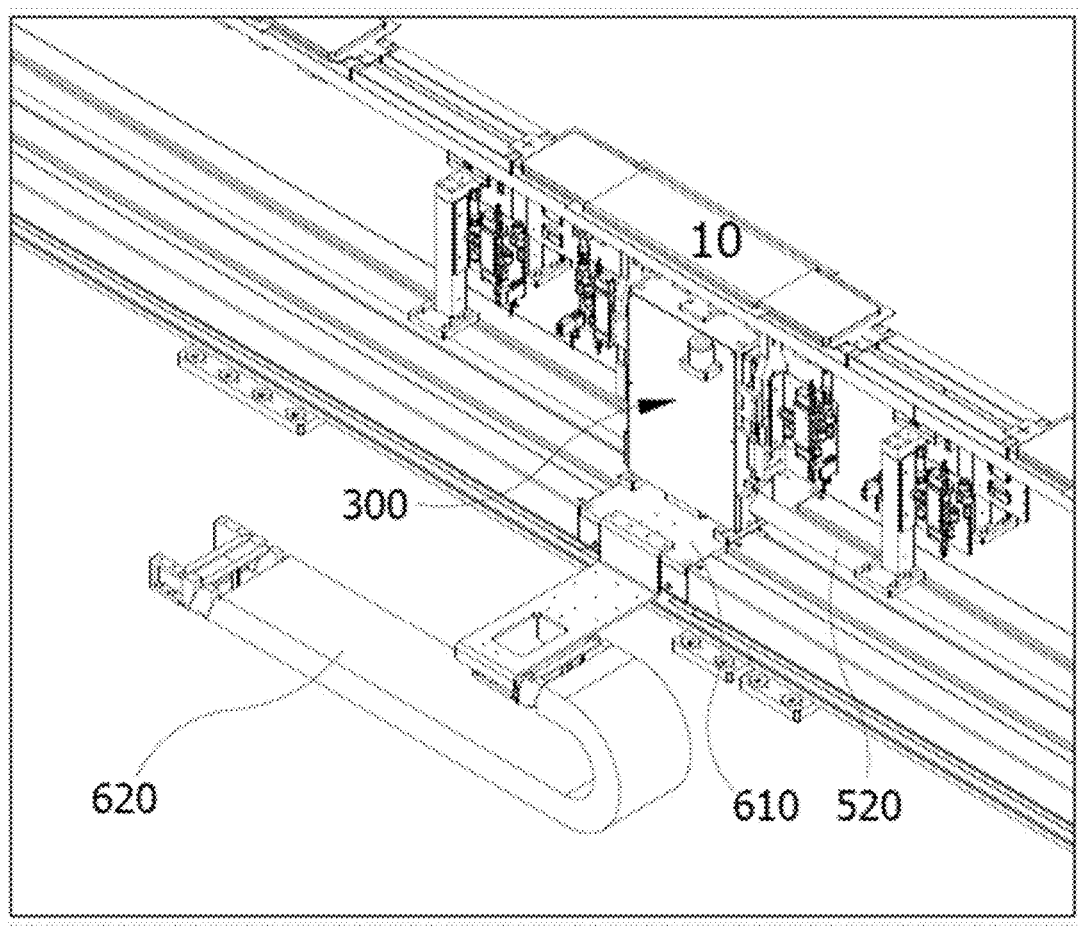
Figure 5C:
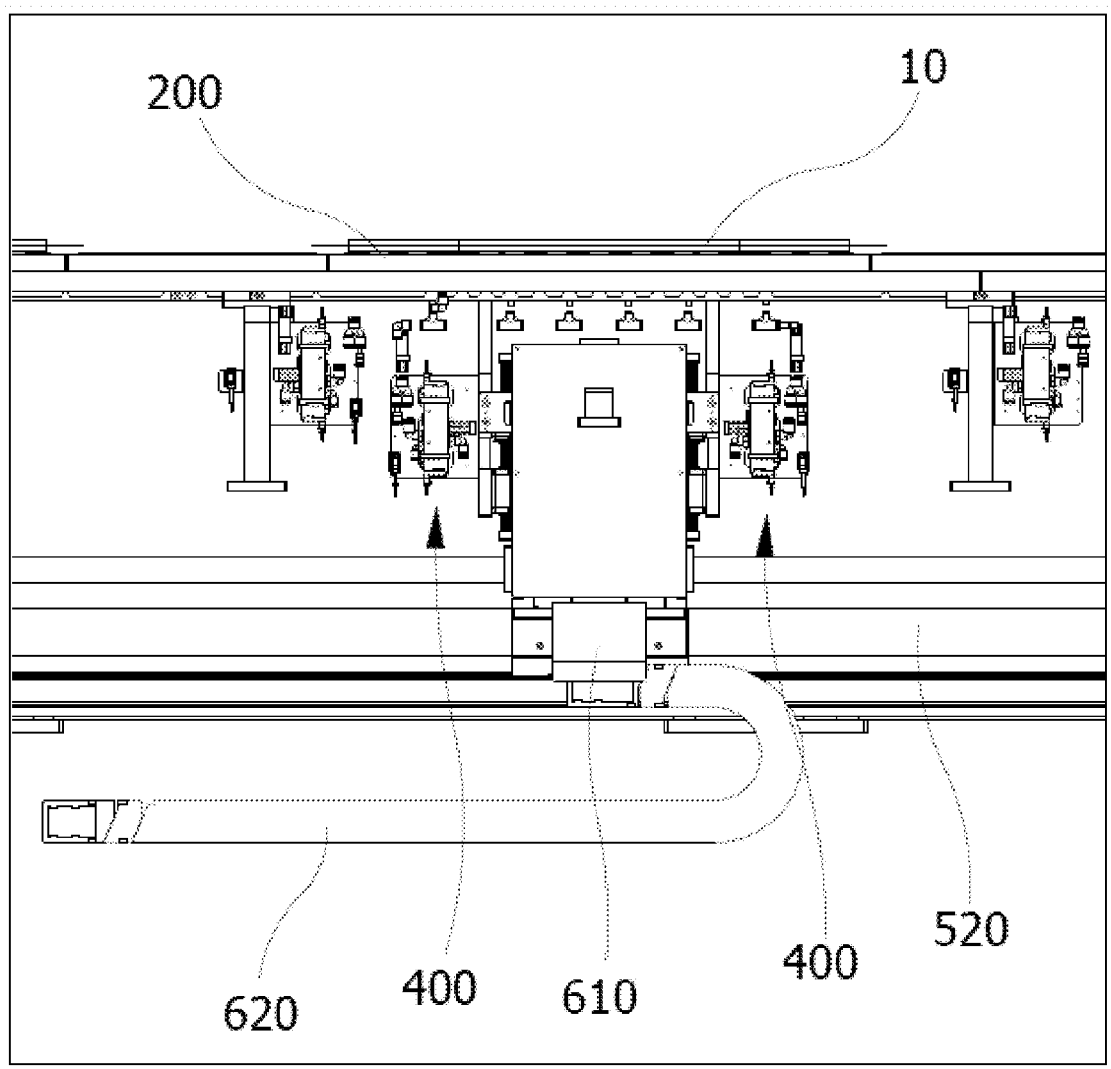
Figure 5D:
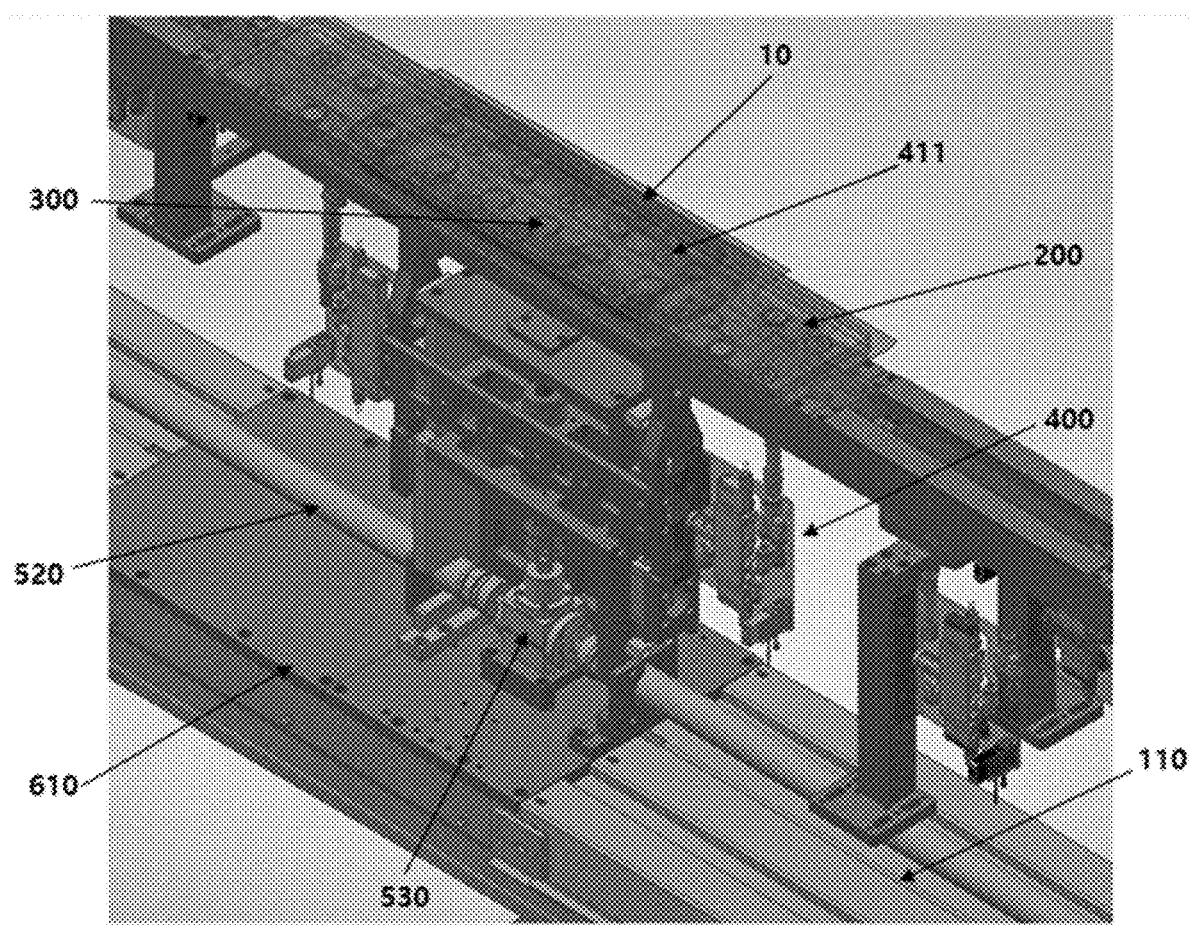

FIG. 4 is a view illustrating the multiple stations having the secondary battery cell transfer apparatus for a process of folding a secondary battery cell according to the exemplary embodiment of the present disclosure.

Referring to FIG. 4, the multiple stations 100 having the secondary battery cell transfer apparatus for a process of folding a secondary battery cell according to the exemplary embodiment of the present disclosure may include a loader unit 120, a cell alignment unit 130, a side cutter unit 140, multiple folding units 150, multiple hot-press units 160, a sizing roller unit 170, and an unloader unit 180 which are provided on an upper portion of the base unit 110.

The base unit 110 supports the respective components for a process of folding a pouch for a secondary battery cell according to the exemplary embodiment of the present disclosure. The respective components (e.g., the loader unit 120, the cell alignment unit 130, the side cutter unit 140, the multiple folding units 150, the multiple hot-press units 160, the sizing roller unit 170, the unloader unit 180, multiple transfer units 900, and the like) are sequentially arranged on the upper portion of the base unit 110. The base unit 110 may be stably fixed, by a fastening means (e.g., a bolt, an anchor, or the like), to a floor surface on which the apparatus is installed.

The loader unit 120 loads the secondary battery cell 10 into the apparatus in order to perform the folding process. When the secondary battery cell 10 is loaded into the apparatus, the secondary battery cell 10 may be seated on the table 200 corresponding to the loader unit 120.

The cell alignment unit 130 aligns the secondary battery cell 10 transferred from the loader unit 120. The secondary battery cell 10 loaded by the loader unit 120 is transferred to a position of the cell alignment unit 130 by the transfer bar 300 corresponding to the loader unit 120, the secondary battery cell 10 is seated on the table 200 on which the cell alignment unit 130 is positioned, and then positions of a front end, a rear end, a left end, a right end, and the like of the secondary battery cell 10 may be aligned in order to perform the subsequent process on the seated secondary battery cell 10.

The side cutter unit 140 cuts, by a predetermined length, a side of the secondary battery cell 10 transferred from the cell alignment unit 130. The secondary battery cell 10 aligned by the cell alignment unit 130 is transferred to a position of the side cutter unit 140 by the transfer bar 300 corresponding to the cell alignment unit 130, the secondary battery cell 10 is seated on the table 200 on which the side cutter unit 140 is positioned, and the side of the secondary battery cell 10 may be cut by the predetermined length in order to perform the folding process on the seated secondary battery cell 10 by the multiple folding units 150.

Since the side of the secondary battery cell 10 is cut so that lengths at front and rear ends become predetermined lengths, the efficiency of the folding process performed on the side of the secondary battery cell 10 may be improved.

The multiple folding units 150 fold the side of the secondary battery cell at predetermined angles. The multiple hot-press units 160 are provided at rear ends of the multiple folding units, respectively, and perform a hot-press process on the side of the secondary battery cell 10 in the state in which the side of the secondary battery cell 10 is folded by the predetermined angle. For example, in the present disclosure, a first folding unit 150A, a first hot-press unit 160A, a second folding unit 150B, and a second hot-press unit 160B may be disposed in this order.

The first folding unit 150A folds the side of the secondary battery cell 10, for example, by 180 degrees. The secondary battery cell 10 of which the side is cut by a predetermined length by the side cutter unit 140 is transferred to a position of the first folding unit 150A by the transfer bar 300 corresponding to the side cutter unit 140. The secondary battery cell 10 is seated on the table 200 on which the first folding unit 150A is positioned, and the seated secondary battery cell 10 may be fixed by the vacuum gripping unit 400 provided in the table 200.

Further, the first folding unit 150A primarily folds the side of the secondary battery cell 10 by 180 degrees. When the primary folding process is completed, the secondary battery cell 10 is transferred to the first hot-press unit 160A by the transfer bar 300 corresponding to the first folding unit 150A. The secondary battery cell 10 is seated on the table 200 on which the first hot-press unit 160A is positioned, and then the seated secondary battery cell 10 may be fixed by the vacuum gripping unit 400 provided in the table 200.

In addition, the first hot-press unit 160A may primarily heat and press, in a hot-press manner, the side of the secondary battery cell 10, which is folded by 180 degrees by the first folding unit 150A, so that the primarily folded state may be maintained.

When the hot-press process is completed by the first hot-press unit 160A, the secondary battery cell 10 is transferred to the second folding unit 150B by the transfer bar 300 corresponding to the first hot-press unit 600A. The secondary battery cell 10 is seated on the table 200 on which the second folding unit 150B is positioned, and then the seated secondary battery cell 10 may be fixed by the vacuum gripping unit 400 provided in the table 200.

Next, the second folding unit 150B may secondarily fold the side of the secondary battery cell 10, for example, by 270 degrees (i.e., the side of the secondary battery cell 10 is additionally folded by 90 degrees in the state in which the side of the secondary battery cell 10 is folded by 180 degrees by the first folding unit 150A).

Further, when the secondary folding process is completed by the second folding unit 150B, the secondary battery cell 10 is transferred to the second hot-press unit 160B by the transfer bar 300 corresponding to the second folding unit 150B. The secondary battery cell 10 is seated on the table 200 on which the second hot-press unit 160B is positioned, and then the seated secondary battery cell 10 may be fixed by the vacuum gripping unit 400 provided in the table 200.

In addition, the second hot-press unit 160B may secondarily heat and press, in a hot-press manner, the side of the secondary battery cell 10, which is folded by 270 degrees by the second folding unit 150B, so that the secondarily folded state may be maintained.

When the hot-press process is completely performed on the side of the secondary battery cell 10 and the secondary battery cell 10 is transferred, the sizing roller unit 170 aligns the secondary battery cell 10 in accordance with the size thereof. The secondary battery cell 10, which is secondarily heated and pressed by the second hot-press unit 160B, is transferred to a position of the sizing roller unit 170 by the transfer bar 300 corresponding to the second hot-press unit 160B. The secondary battery cell 10 is seated on the table 200 on which the sizing roller unit 170 is positioned, and then the seated secondary battery cell 10 may be aligned in accordance with the size thereof.

The unloader unit 180 unloads the secondary battery cell 10 transferred from the sizing roller unit 170. The secondary battery cell 10, which is aligned by the sizing roller unit 170 in accordance with the size of the secondary battery cell 10, is transferred to a position of the unloader unit 180 by the transfer bar 300 corresponding to the sizing roller unit 170. The secondary battery cell 10 is seated on the table 200 on which the unloader unit 180 is positioned, and the secondary battery cell 10 may be ready to be unloaded.

FIGS. 5A to 5D are detailed configuration views of the secondary battery cell transfer apparatus for a process of folding a secondary battery cell according to the exemplary embodiment of the present disclosure.

The secondary battery cell transfer apparatus for a process of folding a secondary battery cell according to the exemplary embodiment of the present disclosure may transfer the secondary battery cells 10 at the same time while reciprocating straight between the first station and the second station in a vacuum gripping manner. The vacuum gripping unit 400, the lifting unit 500, and the straight transfer unit 600 will be described in detail with reference to FIGS. 5A to 5D.

The vacuum gripping units 400 are provided in the table 200 and the transfer bar 300, respectively, and selectively vacuum-grip the secondary battery cell 10. The vacuum gripping units 400 each may include a pressure sensor, an on-off valve, a vacuum pump, or the like connected to each of multiple vacuum pads 411 provided on the table 200 and the transfer bar 300 or include a vacuum pump, a change-over valve, or the like. The vacuum gripping units 400 may vacuum-grip the secondary battery cell 10 or release the gripped state (sucked state) by selectively opening or closing a valve for supplying compressed air. The specific configuration and description of the vacuum gripping unit 400 will be described below.

The lifting unit 500 may include a lifting motor 510 configured to provide lifting drive power to raise or lower the transfer bar 300, a rotary shaft 520 configured to be rotated by the lifting drive power of the lifting motor 510, and a universal joint 530 configured to transmit rotational force of the rotary shaft 520, as lifting force, to the transfer bar 300.

The lifting unit 500 may move the transfer bar 300 upward so that the secondary battery cell 10 is vacuum-gripped by the transfer bar 300. The lifting unit 500 may move the transfer bar 300 downward so that the secondary battery cell 10 is seated on the table 200 of the second station B.

The straight transfer drive unit 600 reciprocally transfers the transfer bar 300 between the first station A and the second station B. The straight transfer drive unit 600 may include an LM guide 610 provided on a lower portion of the transfer bar 300 and coupled to the base unit 110 so as to be movable straight, a transfer motor (not illustrated) configured to provide straight transfer force to the LM guide 610, and a cable bear 620 configured to reciprocate the LM guide 610 between the first station A and the second station B in accordance with the straight drive power of the transfer motor.

Figure 6A:
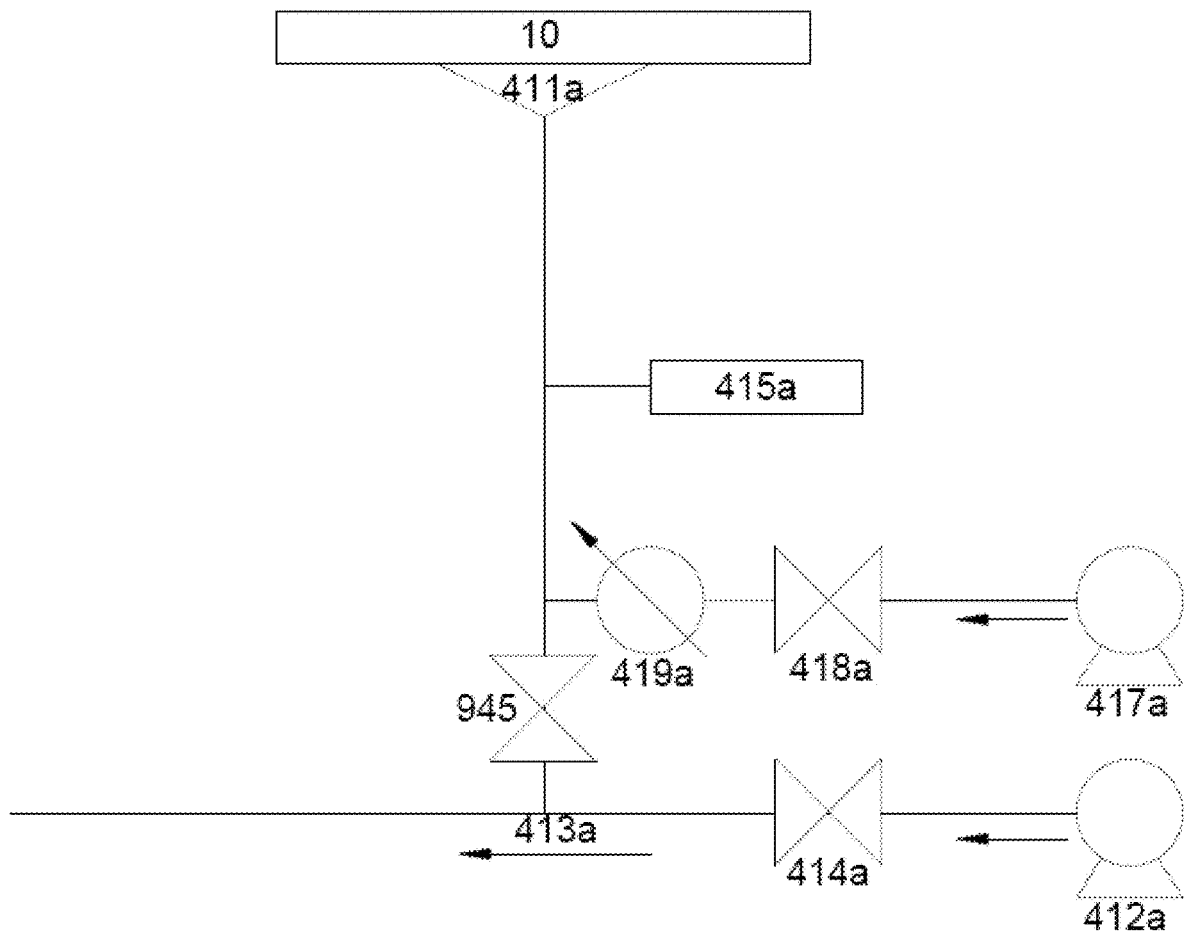
FIGS. 6A and 6B are views for explaining vacuum gripping control performed by the secondary battery cell transfer apparatus for a process of folding a secondary battery cell according to the exemplary embodiment of the present disclosure.
Figure 6B:
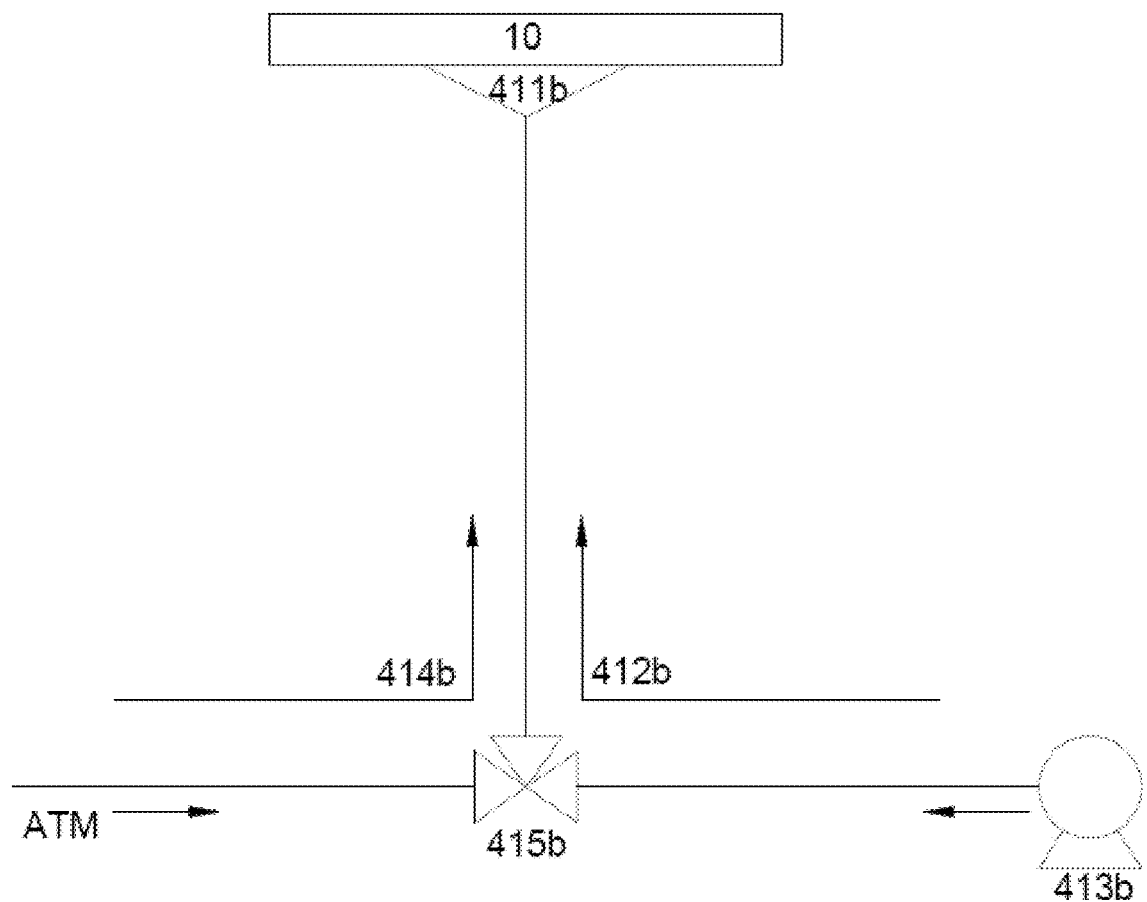

FIGS. 6A and 6B are views for explaining the vacuum gripping control performed by the secondary battery cell transfer apparatus for a process of folding a secondary battery cell according to the exemplary embodiment of the present disclosure.

The vacuum gripping control will be described with reference to FIGS. 6A and 6B. As illustrated in FIG. 6A, vacuum gripping units 400A according to a first exemplary embodiment are provided in the table 200 and the transfer bar 300, respectively. The vacuum gripping unit 400A includes multiple vacuum pads 411a provided on a surface that comes into contact with the secondary battery cell 10. In the case of the vacuum suction control, a vacuum is generated by the Venturi effect caused by a flow of compressed air supplied to a venturi tube 413a from a first compressor 412a (or a compression tank), and vacuum pressure is provided to the multiple vacuum pads 411a. Therefore, the secondary battery cell 10 seated on the table 200 may be vacuum-sucked by the multiple vacuum pads 411a provided on the table 200, or the secondary battery cell 10 may be vacuum-sucked by the multiple vacuum pads 411a provided on the transfer bar 300 in order to transfer the secondary battery cell 10.

In this case, a first pneumatic pressure valve 414a may supply or cut off the flow of compressed air to be supplied to the venturi tube 413a. A pressure sensor 415a may detects the pressure provided to the vacuum pad 411a in order to open or close the first pneumatic pressure valve 414a. A check valve 416a may prevent the vacuum state provided to the vacuum pad 411a from flowing reversely to the venturi tube 413a (from being purged).

In addition, in the case of the vacuum release control, the first pneumatic pressure valve 414a may be closed to cut off the supply of the vacuum pressure to the vacuum pad 411a, and a second pneumatic pressure valve 418a may be opened to supply compressed air to the vacuum pads 411a from a second compressor 417a (or a compression tank). The compressed air may be provided at a pressure corresponding to the atmospheric pressure by adjusting a supply time, a supply pressure, a flow rate, and the like by a variable capacity pump 419a.

In the case of the vacuum gripping control according to the first exemplary embodiment as illustrated in FIG. 6A, compressed air having a pressure equal to the atmospheric pressure needs to be supplied to release the vacuum, but there is a problem in that control is difficult to perform and noise, vibration, deviation, and the like occur.

To solve the problem, as illustrated in FIG. 6B, vacuum gripping units 400B according to a second exemplary embodiment are provided in the table 200 and the transfer bar 300, respectively. The vacuum gripping unit 400B may include multiple vacuum pads 411b provided on a surface that comes into contact with the secondary battery cell 10, a vacuum control line 412b configured to communicate with the vacuum pads 411b, a pump 413b configured to selectively communicate with the vacuum control line 412b and apply a vacuum by discharging air positioned in a space between the vacuum pad 411b and the secondary battery cell 10, a vacuum release line 414b configured to selectively communicate with the vacuum control line 412b and release the vacuum by allowing the space between the vacuum pad 411b and the secondary battery cell 10 to communicate with outside air, and a change-over valve 415b configured to selectively allow the vacuum control line 412b to communicate with the pump 413b and the vacuum release line 414b.

The vacuum gripping unit 400B according to the second exemplary embodiment in which the vacuum gripping control is performed as described above need not to continuously produce a flow of air, such as a Venturi tube, and may prevent a problem in that the cell vibrates when releasing the vacuum (i.e., the problem caused by a difference between the atmospheric pressure and the pressure in the space between the cell and the vacuum pad).

Meanwhile, the apparatus in the related art employing the conventional transfer method is compared with the apparatus according to the present disclosure that adopts the transfer method according to the exemplary embodiment of the present disclosure. In the case of the apparatus in the related art, since the cover is mechanically fixed using force of the spring, the fixing force is only about 3 to 5 kg. In contrast, since the apparatus according to the present disclosure adopts the fixing method that utilizes the vacuum pads, the fixing force is approximately 9 to 20 kg, and as a result, it is possible not only to improve the degree of fixing the cell during the process, but also to improve the folding quality of the secondary battery cell.

Further, the apparatus in the related art has an overhang of 200% or more and a maximum transfer speed of approximately 600 mm/sec. In contrast, the apparatus according to the present disclosure has no overhang and has a maximum transfer speed of approximately 1500 mm/sec, and as a result, the sway of the cell may be reduced, and the tact time may be improved.

In addition, the apparatus in the related art uses a circular servo motor, while the apparatus according to the present disclosure uses a linear motor. Therefore, in the case of the apparatus according to the present disclosure, not only the motion characteristics for the transfer operation may be improved, but also the life characteristics may be improved.

In addition, in the case of the apparatus in the related art, each process unit needs to individually operate the lower cylinder, while in the case of the apparatus according to the present disclosure, it is not necessary to operate the lower cylinder. Therefore, in the case of the apparatus according to the present disclosure, the number of operations is reduced, and as a result, stability may be improved, and maintenance may be easily performed.

And, in the case of the apparatus in the related art, since the mechanical fixing method using the cover is adopted, a non-clamped cylinder needs to be used, and as a result, the folding track is not only continuously damaged, but also vibration shock occurs due to track time. In contrast, in the case of the apparatus according to the present disclosure, since the fixing method using the vacuum pad is adopted, it is possible to prevent damage caused by the folding track.

In addition, in the case of the apparatus in the related art, the sway of the nest increases over time, and an overhang is very large, whereas in the case of the apparatus according to the present disclosure, the process tables are separately installed and do not sway, and as a result, it is possible to not only perform a stable folding process because of the use of a separated fixed table for each process module, but also improve the folding quality.

Regarding the tact time required for the folding process of the secondary battery cell transfer apparatus for a process of folding a secondary battery cell, the related art and the present disclosure are compared as follows. The related art and the present disclosure are compared in terms of the cycle time and the tact time in consideration of the motion, the maximum stroke, the motion steps, the maximum speed of the units (e.g., a pitch transfer, a loader, an aligner, a side cutter, 180 folding cam followers, 180 folder presses, 90 folding cam followers, 90 folder presses, etc.) for performing the entire folding process on the secondary battery cell.

As a result, in the secondary battery cell transfer apparatus that performs each process by transferring the secondary battery cells according to the transfer method of the related art, the cycle time of 6.0 seconds and the tact time of 10.0 ppm are obtained. In contrast, in the secondary battery cell transfer apparatus to which the transfer method according to the exemplary embodiment of the present disclosure is applied, it may be ascertained that the process speed is markedly improved as the cycle time of 4.8 seconds and the tact time of 12.5 ppm are obtained.

In addition, it can be seen that in the secondary battery cell transfer apparatus in which each process is performed by transferring the secondary battery cells according to the transfer method of the related art, the unit 1-cycle time is 4 seconds for each unit (the loader, the aligner, the side cutter, the 180 folding cam followers, the 180 folder presses, the 90 folding cam followers, and the 90 folder presses). Further, in the secondary battery cell transfer apparatus according to the exemplary embodiment of the present disclosure, it can be seen that the unit 1-cycle time is about 2.5 to 3.0 seconds for each unit (the loader, the aligner, the side cutter, the 180 folding cam followers, the 180 folder presses, the 90 folding cam followers, and the 90 folder presses).

In particular, the main track transfer time of the pitch transfer unit for one cycle is 2.0 seconds in the secondary battery cell transfer apparatus in the related art. In contrast, the main track transfer time of the pitch transfer unit for one cycle is 1.1 seconds in the secondary battery cell transfer apparatus according to the exemplary embodiment of the present disclosure. Therefore, it can be seen that in the case of the present disclosure, the process time may be significantly reduced.

The results as described above will be described in detail. In the case of the pitch transfer unit, the apparatus in the related art performs the pitch rotation using a servo motor by rotating the nest with an overhang. In contrast, in the apparatus according to the present disclosure, the process time may be reduced to about 2 seconds to about 1.1 seconds by showing a speed of 800 to 1,500 mm/sec due to the transfer structure using a servo motor.

In the case of a loader unit, in the apparatus in the related art, a loss of opening/closing time of a long stroke occurs due to the fixing method using a nest clamp. In contrast, in the apparatus according to the present disclosure, the process time may be reduced to about 4 seconds to about 2.7 seconds by applying a vacuum gripping method rather than the fixing method using a clamping.

In the case of an aligner unit, the apparatus in the related art performs sequential left and right movements in y-axis 2-stage and z-axis 2-stage, and the number of movements is large due to the opening/closing time of the clamp and the application of the two-stage z-axis. In the contrast, in the apparatus according to the present disclosure, because the z-axis axis is reduced to 1-stage and no cover clamp is applied, the process time may be reduced to about 4 seconds to about 2.7 seconds.

In the case of a side cutter unit, the apparatus in the related art needs to perform operations such as lower rising, upper lowering, and returning. In the contrast, in the apparatus according to the present disclosure, since the lowering operation is not required, the process time may be reduced to about 4 seconds to about 2.7 seconds.

In the case of the 180 folding cam follower units and 90 folding cam follower units, in the apparatus in the related art, the fixing degree of the secondary battery cell is low, so the folding operation speed needs to be adjusted to approximately 300 mm/sec or less, and returned to 600 mm/sec when transferring the pitch. In contrast, the apparatus according to the present disclosure, the cell height is increased due to the vacuum suction control, so that the folding operation speed may be increased to approximately 300 mm/sec or more, and the transfer apparatus may return to a speed of approximately 800 to 1,000 mm/sec during the pitch transfer. Therefore, the process time may be reduced to approximately 4 seconds to approximately 3 seconds, respectively.

In the case of 180 folder press units, the apparatus in the related art requires working time and cylinder return operation due to the upward movement of the lower press and the downward movement of the upper press. In contrast, the apparatus according to the present disclosure, since the lowering operation is not required due to the vacuum gripping method at the lower side, the process time may be reduced to about 4 seconds to about 2.7 seconds.

In the case of 90 folder press units, the apparatus in the related art requires working time and cylinder return operation due to the upward movement of the lower stripper, the downward movement of the upper stripper, and the side press advance. In contrast, the apparatus according to the present disclosure, since the lowering operation is not required due to the vacuum gripping method at the lower side, the process time may be reduced to about 4 seconds to about 3.7 seconds.

As described above, the apparatus in the related art shows the cycle time of 6.0 seconds and the tact time of 10.0 ppm considering the working time for each unit. In contrast, in the apparatus according to the present disclosure, it can be ascertained that the process speed is significantly improved as the cycle time of 4.8 seconds and the tact time of 12.5 ppm are obtained.

Meanwhile, the method of fixing a secondary battery cell of a secondary battery cell transfer apparatus for a process of folding a secondary battery cell in the related art and the method according to the exemplary embodiment the present disclosure will be compared. In the mechanical cover clamp applied in the apparatus in the related art, the process chucking force provided during the process is 3.0 kg. In contrast, it can be seen that for the vacuum pad clamp applied to the apparatus according to the present disclosure, the process chucking force is 17.7 kg that is significantly improved.

In addition, in the mechanical cover clamp applied in the apparatus in the related art, the transfer chucking force provided during the transfer is 3.0 kg. In contrast, it can be seen that for the vacuum pad clamp applied to the apparatus according to the present disclosure, the transfer chucking force is 8.8 kg that is significantly improved.

As set forth above, according to exemplary embodiments of the invention, the secondary battery cells are simultaneously and individually transferred from the first station to the second station among the multiple stations continuously arranged to fold the pouch of the secondary battery cell, and the secondary battery cell is vacuum-sucked in the vacuum gripping manner and then transferred, such that productivity may be improved by reducing the tact time for the folding process.

Further, according to the present disclosure, the table on which the secondary battery cell is seated is vacuum-gripped, the process is performed in the first station in the state in which the secondary battery cell is vacuum-gripped, the secondary battery cell is transferred to the second station when the process is completed, and the transfer bar returns back to the original position and vacuum-grips a subsequent secondary battery cell, such that the secondary battery cell may be smoothly fixed in the vacuum gripping manner or released, and as a result, the tact time for a folding process may be further reduced.

In addition, according to the present disclosure, the secondary battery cell may be stably fixed with a sufficient pressure during the folding process, and the secondary battery cell may be vacuum-sucked, and aligned and transferred at an exact position, such that the folding quality may be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A secondary battery cell transfer apparatus for a process of folding a secondary battery cell, the secondary battery cell transfer apparatus comprising:
    multiple stations disposed at an equal interval and sequentially disposed in a straight process direction so as to perform a process of folding a sealing region of a secondary battery cell;
    tables provided in the multiple stations, respectively, and configured to vacuum-grip and support the secondary battery cell from below the secondary battery cell;
    transfer bars provided in the multiple stations, respectively, and configured to vacuum-grip the secondary battery cell from below the secondary battery cell and transfer the secondary battery cell between the first station and the second station arranged continuously in the process direction, the transfer bar being configured to vacuum-grip the secondary battery cell, which is supported by the table in the first station, from below the secondary battery cell, move the secondary battery cell upward, and then move the secondary battery cell to the second station straight, and the transfer bar being configured to move downward, so that the secondary battery cell is seated on the table of the second station, and then return to a position of the first station;
    vacuum gripping units provided in the table and the transfer bar, respectively, and configured to selectively apply vacuum gripping force to the secondary battery cell;
    a lifting unit configured to operate a lifting operation of the transfer bar; and
    a straight transfer drive unit configured to operate a straight reciprocating motion of the transfer bar.

2. The secondary battery cell transfer apparatus of claim 1, wherein the table is configured as a straight bar parallel to the process direction, the tables are provided in two parallel rows in the process direction so as to support both sides of a lower surface of the secondary battery cell, the transfer bar is disposed between the tables provided in two rows, and the transfer bar is provided straight so as to be parallel to the table.

3. The secondary battery cell transfer apparatus of claim 1, wherein the vacuum gripping unit comprises:
    multiple vacuum pads provided on the table and the transfer bar, respectively, and provided on a surface that comes into contact with the secondary battery cell;
    a vacuum control line configured to communicate with the vacuum pads;
    a pump configured to selectively communicate with the vacuum control line and apply vacuum by discharging air positioned in a space between the vacuum pads and the secondary battery cell;
    a vacuum release line configured to selectively communicate with the vacuum control line and release the vacuum by allowing the space between the vacuum pad and the secondary battery cell to communicate with outside air; and
    a change-over valve configured to allow the vacuum control line to selectively communicate with the pump and the vacuum release line.

4. The secondary battery cell transfer apparatus of claim 3, wherein when the secondary battery cell is seated on the table of the first station, a process is performed on the secondary battery cell in the first station in a state in which the secondary battery cell is vacuum-gripped by a table vacuum pad of the first station.

5. The secondary battery cell transfer apparatus of claim 4, wherein when the process in the first station is completed, the vacuum of the table vacuum pad of the first station is released, and the secondary battery cell is vacuum-gripped by the transfer bar of the first station which is moved upward by the lifting unit.

6. The secondary battery cell transfer apparatus of claim 5, wherein the secondary battery cell is vacuum-gripped by the transfer bar of the first station, transferred to the second station by the straight transfer drive unit, and then seated on the table of the second station as the transfer bar of the first station is moved downward by the lifting unit.

7. The secondary battery cell transfer apparatus of claim 6, wherein the secondary battery cell is vacuum-gripped by a table vacuum pad of the second station when the transfer bar of the first station is moved downward and seated on the table of the second station, and the transfer bar of the first station releases the vacuum, moves downward, and then returns to the first station when the secondary battery cell is vacuum-gripped by the table vacuum pad of the second station.

8. The secondary battery cell transfer apparatus of claim 1, wherein the lifting unit comprises:
    a lifting motor configured to provide lifting drive power;
    a rotary shaft configured to be rotated by the lifting drive power; and
    a universal joint configured to transmit rotational force of the rotary shaft, as lifting force, to the transfer bar.

9. The secondary battery cell transfer apparatus of claim 8, wherein the straight transfer drive unit comprises:
    an LM guide provided on a lower portion of the transfer bar, coupled to a base unit for supporting the multiple stations so as to be movable straight;
    a transfer motor configured to provide straight transfer force; and
    a cable bear configured to reciprocate the LM guide between the first station and the second station in accordance with the straight drive power.

10. The secondary battery cell transfer apparatus of claim 9, wherein the multiple stations comprise:
    a loader unit configured to load the secondary battery cell;
    a cell alignment unit configured to align the loaded secondary battery cell;

a side cutter unit configured to cut a side of the aligned secondary battery cell by a predetermined length;

multiple folding units configured to fold the side of the secondary battery cell respectively by a predetermined angle;

multiple hot-press units provided at rear ends of the multiple folding units, respectively, and configured to perform a hot-press process on the side of the secondary battery cell in a state in which the side of the secondary battery cell is folded by the predetermined angle;

a sizing roller unit configured to align the secondary battery cell in accordance with a size of the secondary battery cell when the hot-press process on the side of the secondary battery cell is completed and the secondary battery cell is transferred; and an unloader unit configured to unload the secondary battery cell transferred from the sizing roller unit.

11. The secondary battery cell transfer apparatus of claim 10, wherein the multiple folding units comprise:

a first folding unit configured to fold the side of the secondary battery cell by 180 degrees; and a second folding unit configured to fold the side of the secondary battery cell by 270 degrees.

12. The secondary battery cell transfer apparatus of claim 11, wherein the tables are separately disposed to correspond to the multiple stations, respectively, or the tables are provided to be connected one another over the multiple stations.

* * * * *